United States Patent
Muta (10) Patent No.: US 7,663,329 B2
(45) Date of Patent: Feb. 16, 2010

(54) MOTOR CONTROL UNIT AND VEHICLE EQUIPPED THEREWITH

(75) Inventor: Koichiro Muta, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 363 days.

(21) Appl. No.: 11/791,225

(22) PCT Filed: Dec. 27, 2005

(86) PCT No.: PCT/IB2005/003895

§ 371 (c)(1),
(2), (4) Date: May 22, 2007

(87) PCT Pub. No.: WO2006/070266

PCT Pub. Date: Jul. 6, 2006

(65) Prior Publication Data

US 2007/0290650 A1 Dec. 20, 2007

(30) Foreign Application Priority Data

Dec. 28, 2004 (JP) .............................. 2004-380953
Nov. 4, 2005 (JP) .............................. 2005-321238

(51) Int. Cl.
*H02P 1/00* (2006.01)

(52) U.S. Cl. ...................... 318/432; 318/430; 318/727; 318/799; 180/65.1; 180/65.3; 180/65.8

(58) Field of Classification Search ................ 318/432, 318/434, 139, 66, 471, 587, 430, 727, 799; 180/65.1, 65.3, 65.8

See application file for complete search history.

(56) References Cited

U.S. PATENT DOCUMENTS

| 5,287,051 | A | | 2/1994 | Konrad et al. |
|---|---|---|---|---|
| 5,376,868 | A | * | 12/1994 | Toyoda et al. ............... 318/587 |
| 5,486,748 | A | | 1/1996 | Konrad et al. |
| 5,659,235 | A | * | 8/1997 | Yamada et al. .............. 318/801 |
| 6,633,450 | B1 | * | 10/2003 | Kaneko ................... 360/73.03 |
| 7,120,037 | B2 | * | 10/2006 | Komatsu et al. .............. 363/37 |
| 7,515,447 | B2 | * | 4/2009 | Ronkainen et al. .......... 363/141 |
| 2001/0002782 | A1 | | 6/2001 | Shimane et al. |
| 2004/0178759 | A1 | * | 9/2004 | Nakamura et al. .......... 318/471 |
| 2004/0221217 | A1 | * | 11/2004 | Sato et al. .................... 714/745 |
| 2005/0123408 | A1 | * | 6/2005 | Koehl .......................... 417/53 |
| 2005/0211490 | A1 | * | 9/2005 | Shimizu et al. .............. 180/243 |
| 2006/0114702 | A1 | * | 6/2006 | Yamada et al. .............. 363/132 |
| 2006/0175995 | A1 | * | 8/2006 | Shinmura et al. ........... 318/139 |
| 2007/0097770 | A1 | * | 5/2007 | Ronkainen et al. .......... 365/211 |

(Continued)

FOREIGN PATENT DOCUMENTS

EP 0 555 574 A1 8/1993

(Continued)

*Primary Examiner*—Paul Ip
(74) *Attorney, Agent, or Firm*—Oliff & Berridge, PLC (57) ABSTRACT

A motor unit and a vehicle equipped with the unit according to the invention includes a control unit that selects a switching frequency, that is, a carrier frequency, in accordance with a rotation speed of the motor and a torque required from a motor. When an inverter temperature becomes high, the control unit limits the torque of the motor to suppress further increase in the inverter temperature. A limit value used in restricted operation is determined in accordance with the temperature and the carrier frequency of the inverter.

8 Claims, 5 Drawing Sheets

U.S. PATENT DOCUMENTS

2008/0181280 A1 * 7/2008 Wang et al. .................... 374/1

FOREIGN PATENT DOCUMENTS

| | | | |
|---|---|---|---|
| JP | A 7-322401 | 12/1995 |
| JP | A 9-121595 | 5/1997 |
| JP | A-2003-324942 | 11/2003 |
| JP | A 2005-86919 | 3/2005 |

* cited by examiner

MOTOR CONTROL UNIT AND VEHICLE EQUIPPED THEREWITH

BACKGROUND OF THE INVENTION

1. Field of the Invention

The invention relates to a motor control unit and a vehicle that is equipped with the motor control unit.

2. Description of the Related Art

Motor drive control systems in which a motor is driven by an inverter are utilized in various fields. In such systems, an inverter circuit for driving a motor includes switching devices such as an IGBT device, a power MOS device and the like. Since these switching devices can be damaged by high temperature, torque is normally limited when the temperature of the inverter increases.

Japanese Patent Application Publication No. JP-A-9-121595 describes a thermal protection device for a power converter, which is capable of thermally protecting a switching device of an inverter circuit without decreasing torque even if the temperature of the switching device becomes high.

When a detected temperature of the switching device rises, the thermal protection this device performs control in which, first, a high carrier frequency is switched to a low carrier frequency without limiting torque. Then, if the temperature still continues to rise, the device sets a torque limit value to be small.

Another related art is described in Japanese Patent Application Publication JP-A-7-322401.

Recently, environmentally friendly vehicles such as electric vehicles, hybrid vehicles, fuel cell vehicles and the like are receiving great attention. These types of vehicles are equipped with a motor that is driven by a direct-current power source and an inverter. The motor generates driving torque for the vehicle.

However, due to demand for reducing the cost and mounting space of the inverter which drives the motor, there is a trend toward smaller inverters with lower heat capacity. If such an inverter is utilized, a sharp rise in temperature is likely to occur due to heat concentration. This temperature rise is particularly apparent at high carrier frequencies where switching is frequently performed.

Note that a carrier frequency fc, which determines the switching frequency, is set based on the rotation speed of the motor and the required torque.

Figure 5A:
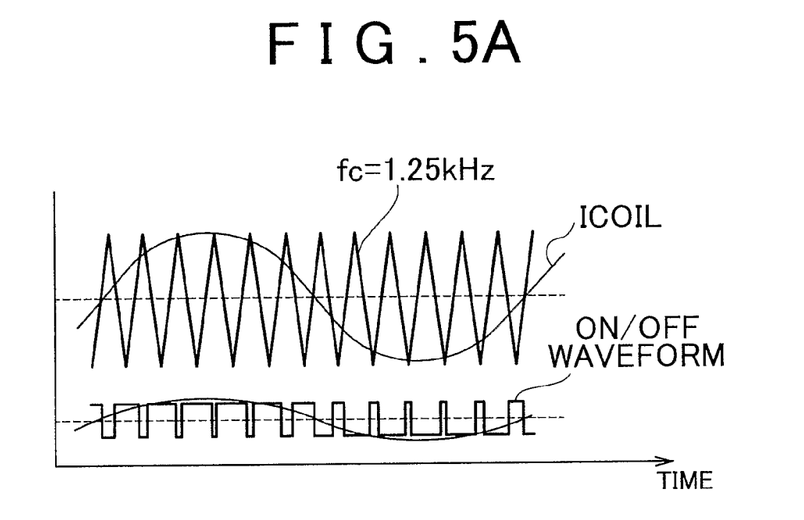
FIGS. 5A and 5B are conceptual diagrams that illustrate the carrier frequencies.
Figure 5B:
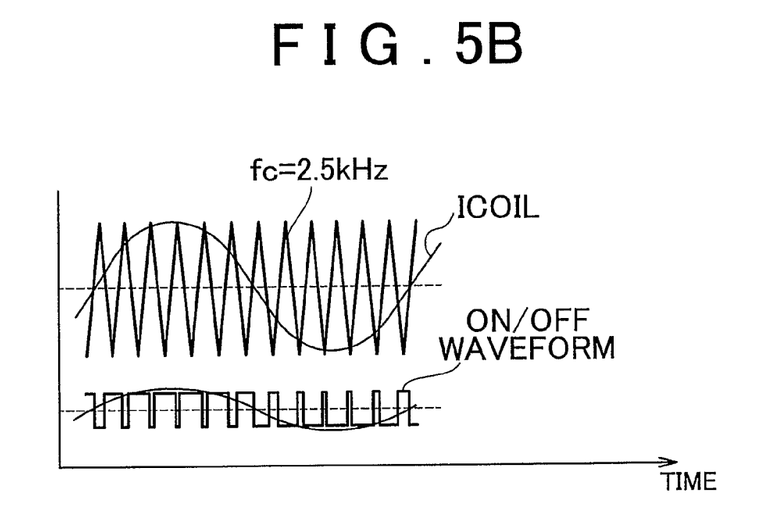

FIGS. 5A and 5B are conceptual diagrams that illustrate the carrier frequency.

FIG. 5A shows a case where the carrier frequency fc is 1.25 kHz. This carrier frequency is used as a basis for PWM controlling ON/OFF waveforms, thereby causing a current ICOIL to flow.

On the other hand, FIG. 5B shows a case where the frequency of the current ICOIL is higher than that in FIG. 5A. In this case, the carrier frequency fc has to be increased to 2.5 kHz to causing a current ICOIL to flow smoothly. The PWM control is performed at this carrier frequency to turn the switching device on and off.

By decreasing the carrier frequency instead of limiting the torque, the number of switching operations can be reduced. Thus, switching loss can be reduced, thereby suppressing the temperature rise by an amount that corresponds to the reduction in the switching loss. However, this does not necessarily allow the motor to rotate smoothly and thus vibration of the motor may increase.

Figure 6:
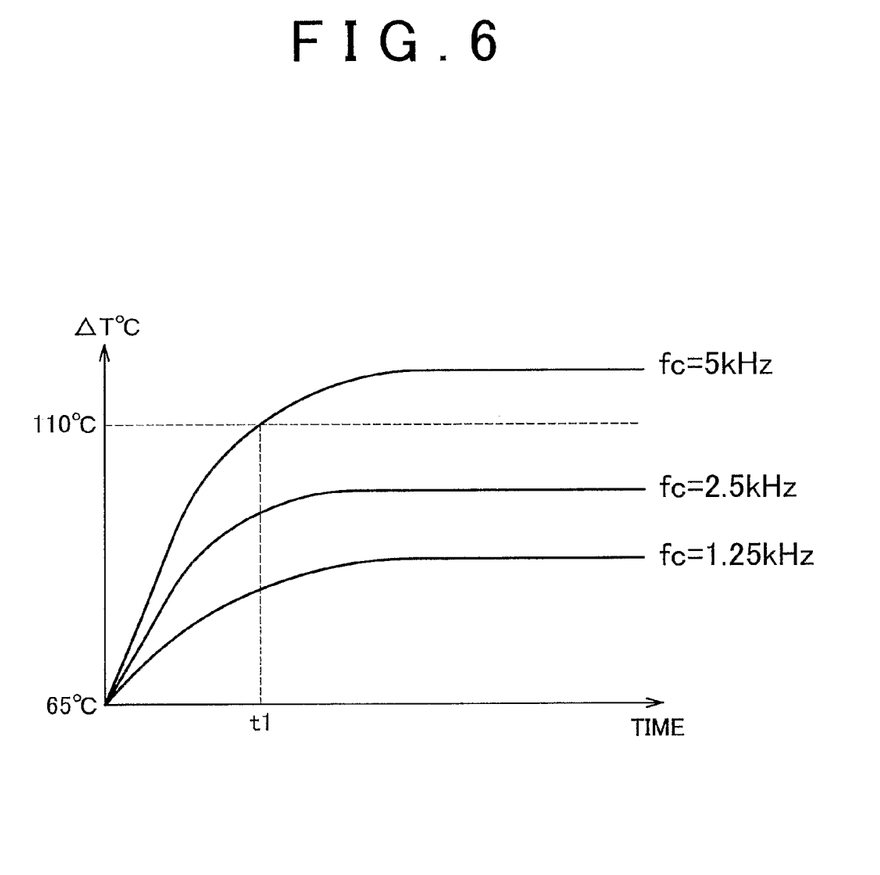
FIG. 6 is a diagram that illustrates the carrier frequency and the temperature rise.

FIG. 6 illustrates the carrier frequency and the temperature rise of the switching device.

FIG. 6 shows a case where the initial temperature is 65° C. In this case, when the carrier frequency fc is 1.25 kHz or fc is 2.5 kHz, the temperature of the switching device does not rise to 110° C., which is the temperature at which the switching device is damaged, even if the motor operation time is prolonged.

On the other hand, when the carrier frequency fc is 5 kHz, the switching loss becomes greater to the extent that the switching frequency is higher, and the switching loss generates heat. Therefore, if the initial temperature is 65° C. as in the cases where the carrier frequency fc is 1.25 kHz or fc is 2.5 kHz, the temperature may exceed 110° C. after a time t1. Accordingly, when the carrier frequency is high, the device is damanged unless countermeasures are taken.

SUMMARY OF THE INVENTION

It is an object of the invention to provide a motor control unit and a vehicle equipped with the unit that can generate required torque to the maximum extent possible and at the same time suppress a temperature rise of a switching device.

A motor control unit according to an aspect of the invention includes: a drive circuit that drives a motor that generates torque to obtain driving force of a vehicle; and a control portion that controls the drive circuit. The control portion controls the drive circuit using a limit value such that the motor performs a restricted operation. The limit value is determined in accordance with a switching frequency of a switching device included in the drive circuit and a temperature of the switching device.

In the motor control unit according to the aspect of the invention, the control portion may control the drive circuit by selecting the switching frequency in accordance with a rotation speed of the motor and a torque required from the motor.

In the motor control unit according to the aspect of the invention, the limit value may be determined based on a torque limit value. The torque limit value may be determined in advance in accordance with the switching frequency and the temperature of the switching device.

Further, in the motor control unit according to the aspect of the invention, the limit value may be determined, when the switching frequency does not increase despite a rotation speed of the motor increasing by at least a predetermined amount, based on the torque limit value determined in advance in accordance with the switching frequency and the temperature of the switching device. Also, the limit value may be determined, when the switching frequency increases as the rotation speed of the motor increases by at least the predetermined amount, based on the torque limit value determined in advance in accordance with the increased switching frequency and the temperature of the switching device.

A vehicle according to the aspect of the invention includes: a motor that generates torque to obtain driving force of the vehicle; and a motor control unit that controls the motor. The motor control unit includes a drive circuit for driving the motor and a control portion for controlling the drive circuit. The control portion controls the drive circuit using a limit value such that the motor performs a restricted operation. The limit value is determined in accordance with a switching frequency of a switching device included in the drive circuit and a temperature of the switching device.

In the vehicle according to the aspect of the invention, the control portion may control the drive circuit by selecting the switching frequency in accordance with a rotation speed of the motor and a torque required from the motor.

In the vehicle according to the aspect of the invention, the limit value may be determined based on a torque limit value, and the torque limit value may be determined in advance in accordance with the switching frequency and the temperature of the switching device.

In the vehicle according to the aspect of the invention, the limit value may be determined, when the switching frequency does not increase despite a rotation speed of the motor increasing by at least a predetermined amount, based on the torque limit value determined in advance in accordance with the switching frequency and the temperature of the switching device. Also, the limit value may be determined, when the switching frequency increases as the rotation speed of the motor increases by at least the predetermined amount, based on the torque limit value determined in advance in accordance with a predicted switching frequency that is higher than the present switching frequency and the temperature of the switching device.

According to the aspect of the invention, in the motor control unit and the vehicle equipped with the unit, the required torque can be generated to the maximum extent possible and at the same time an switching device can be protected.

BRIEF DESCRIPTION OF THE DRAWINGS

The foregoing and/or further objects, features and advantages of the invention will become more apparent from the following description of a preferred embodiment with reference to the accompanying drawings, in which the same or corresponding portions are denoted by the same reference numerals and wherein.

DETAILED DESCRIPTION OF THE PREFERRED EMBODIMENTS

Hereinafter, an embodiment of the invention will be described in detail, with reference to the drawings. Note that the same or corresponding portions are denoted by the same reference numerals and a description thereof will be omitted.

Figure 1:
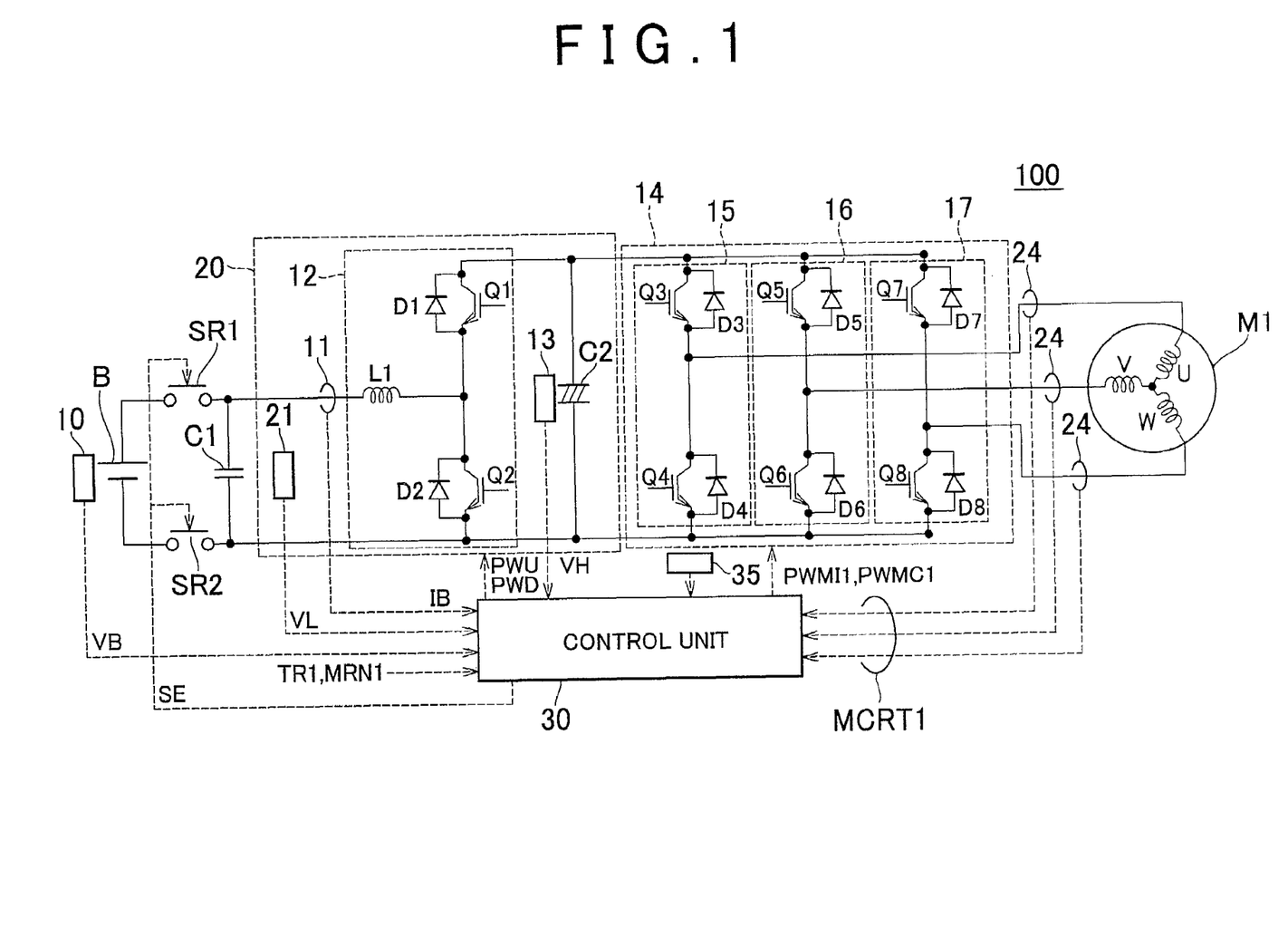
FIG. 1 is a circuit diagram illustrating a configuration of a vehicle 100 that is equipped with a motor control unit according to the invention.

FIG. 1 is a circuit diagram showing a configuration of a vehicle 100 that is equipped with a motor control unit of the invention.

The vehicle 100 is equipped with a battery B, a voltage sensor 10, system main relays SR1, SR2, a capacitor C1, a voltage converter 20, an inverter 14, a temperature sensor 35, a current sensor 24 and a control unit 30.

The battery B is a secondary battery such as a nickel metal hydride battery, a lithium-ion battery or the like. The voltage sensor 10 detects a direct-current (DC) voltage VB that is output from the battery B and outputs a signal reflecting the detected DC voltage to the control unit 30. The system main relays SR1, SR2 are turned on or off by a signal SE from the control unit 30. More specifically, the system main relays SR1, SR2 are turned on when the signal SE is at a high level (logical high) and are turned off when the signal SE is at a low level (logical low). The capacitor C1 smoothes out the voltage between the terminals of the battery B when the system main relays SR1, SR2 are on.

The voltage converter 20 includes a voltage sensor 21, a current sensor 11, a boost converter 12, a capacitor C2 and a voltage sensor 13.

The current sensor 11 detects a direct current passing between the battery B and the boost converter 12. The current sensor 11 then outputs a direct current IB signal that reflects the detected current to the control unit 30.

The boost converter 12 includes a reactor L1, IGBT devices Q1, Q2 and diodes D1, D2. The reactor L1 is connected at one end to a positive electrode of the battery B via the system main relay SR1. The IGBT devices Q1, Q2 are connected in series between output terminals of the boost converter 12 that outputs a voltage VH. The diodes D1, D2 are connected in parallel to the IGBT devices Q1, Q2, respectively.

The other end of the reactor L1 is connected to an emitter of the IGBT device Q1 and to a collector of the IGBT device Q2. A cathode of the diode D1 is connected to a collector of the IGBT device Q1 while an anode of the diode D1 is connected to the emitter of the IGBT device Q1. A cathode of the diode D2 is connected to the collector of the IGBT device Q2 while an anode of the diode D2 is connected to an emitter of the IGBT device Q2.

The voltage sensor 21 detects a voltage of the input side of the boost converter 12, namely, a voltage VL. The current sensor 11 detects a current flowing to the reactor L1, namely, a current IB. The capacitor C2 is connected to the output side of the boost converter 12 and stores energy supplied from the boost converter 12. The capacitor C2 also smoothes out the voltage. The voltage sensor 13 detects a voltage of the output side of the boost converter 12, that is, the voltage between the electrodes of the capacitor C2, namely, a voltage VH.

The inverter 14 drives an alternating-current (AC) motor M1 at a boosted voltage supplied from the boost converter 12. The inverter 14 also returns electric power, which is generated by the AC motor M1 in conjunction with regenerative braking, to the boost converter 12. At this time, the boost converter 12 is controlled by the control unit 30 to operate as a step-down circuit.

The AC motor M1 is a motor for generating torque for driving a driven wheel (not shown) of the vehicle 100. This motor may, for example, be suitable for a hybrid vehicle. More specifically, the motor may function as a generator driven by an engine (not shown), and may also operate as an electric motor for the engine that can start the engine.

The inverter 14 includes a U-phase arm 15, a V-phase arm 16 and a W-phase arm 17. The U-phase arm 15, the V-phase arm 16 and the W-phase arm 17 are connected in parallel between output lines of the boost converter 12.

The U-phase arm 15 includes IGBT devices Q3, Q4 and diodes D3, D4. The IGBT devices Q3 and Q4 are connected in series with each other, and the diodes D3, D4 are connected in parallel to the IGBT devices Q3, Q4, respectively. A cathode of the diode D3 is connected to a collector of the IGBT device Q3 while an anode of the diode D3 is connected to an emitter of the IGBT device Q3. A cathode of the diode D4 is connected to a collector of the IGBT device Q4 while an anode of the diode D4 is connected to an emitter of the IGBT device Q4.

The V-phase arm 16 includes IGBT devices Q5, Q6 and diodes D5, D6. The IGBT devices Q5 and Q6 are connected in series with each other, and the diodes D5, D6 are connected in parallel to the IGBT devices Q5, Q6, respectively. A cathode of the diode D5 is connected to a collector of the IGBT device Q5 while an anode of the diode D5 is connected to an emitter of the IGBT device Q5. A cathode of the diode D6 is connected to a collector of the IGBT device Q6 while an anode of the diode D6 is connected to an emitter of the IGBT device Q6.

The W-phase arm 17 includes IGBT devices Q7, Q8 and diodes D7, D8. The IGBT devices Q7 and Q8 are connected in series with each other, and the diodes D7, D8 are connected in parallel to the IGBT devices Q7, Q8, respectively. A cathode of the diode D7 is connected to a collector of the IGBT device Q7 while an anode of the diode D7 is connected to an emitter of the IGBT device Q7. A cathode of the diode D8 is connected to a collector of the IGBT device Q8 while an anode of the diode D8 is connected to an emitter of the IGBT device Q8.

An intermediate point of each phase arm 15, 16, 17 is connected to respective ends of U-phase, V-phase and W-phase coils of the AC motor M1. The AC motor M1 is a three-phase permanent magnet motor, in which one end of each of the three coils is connected to the others at a midpoint between them. The other end of the U-phase coil is connected to a connection node of the IGBT devices Q3, Q4. The other end of the V-phase coil is connected to a connection node of the IGBT devices Q5, Q6. The other end of the W-phase coil is connected to a connection node of the IGBT devices Q7, Q8.

The current sensor 24 detects a current flowing through the AC motor M1, namely, a motor current MCRT1. The current sensor 24 then outputs the motor current MCRT1 to the control unit 30.

The temperature sensor 35 detects a temperature of the inverter 14 and outputs an inverter temperature T signal. Note that the inverter temperature T corresponds to the temperature of the switching devices Q3 to Q8.

The control unit 30 receives signals for a torque command value TR1, a rotation speed of the motor MRN1, the voltages VB, VL, VH, the current IB, the motor current MCRT1 and the inverter temperature T. The control unit 30 then outputs a boost instruction PWU and a step-down instruction PWD to the voltage converter 20. Further, the control unit 30 outputs a drive instruction PWMI1 and a regeneration instruction PWMC1 to the inverter 14. The drive instruction PWMI1 instructs the inverter 14 to convert the DC voltage output from the boost converter 12 to an AC voltage for driving the motor M1. The regeneration instruction PWMC1 instructs the inverter 14 to convert the AC voltage generated by the motor M1 to a DC voltage so as to return the DC voltage to the boost converter 12 side.

Next, the operation of the voltage converter 20 will be briefly explained. The boost converter 12 in the voltage converter 20 operates as a boost circuit serving as a forward conversion circuit that supplies the electric power from the battery B to the inverter 14 in a powering operation. Conversely, in a regenerative operation, the boost converter 12 operates as a step-down circuit serving as a reverse conversion circuit that charges electric power generated by the motor M1 to the battery B.

The boost converter 12 operates as a boost circuit by turning the IGBT device Q2 on and off, when the IGBT device Q1 is off. More specifically, when the IGBT device Q2 is on, the current flows along a path from the positive electrode of the battery B to the negative electrode of the battery B via the reactor L1 and the IGBT device Q2. While the current flows, energy is stored in the reactor L1.

When the IGBT device Q2 is turned off, the energy stored in the reactor L1 flows to the inverter 14 side via the diode D1. As a result, the voltage between the electrodes of the capacitor C2 increases. Accordingly, the output voltage of the boost converter 12 applied to the inverter 14 is boosted.

On the other hand, the boost converter 12 operates as a step-down circuit by turning the IGBT device Q1 on and off, when the IGBT device Q2 is off. More specifically, when the IGBT device Q1 is on, the regenerated current that is returned via the inverter 14 flows through the IGBT device Q1 and the reactor L1 to the battery B.

Further, when the IGBT device Q1 is off, a loop including the reactor L1, the battery B and the diode D2 is formed, and the energy stored in the reactor L1 is charged to the battery B. In this reverse conversion, the time period for which the inverter 14 supplies the electric power is longer than the time period for which the battery B receives the electric power. Therefore, the voltage of the inverter 14 is lowered and charged to the battery B. The operation of the voltage converter 20 is appropriately controlled by switching between the powering operation and regenerative operation.

It should be noted that the regenerative control includes regeneration of power in a hybrid vehicle or an electric vehicle when the driver brakes the vehicle by depressing a foot pedal. The regenerative control also includes regeneration of power when the vehicle is decelerated or acceleration ceased when an accelerator pedal is released, even if the foot brake is not depressed.

The control unit 30 controls the inverter 14 by selecting a switching frequency, namely, a carrier frequency fc, in accordance with the rotation speed of the motor and the torque required from the motor M1.

The inverter 14 drives the motor M1 to generate torque for obtaining driving force of the vehicle. The control unit 30 controls the inverter 14 such that the motor M1 performs a restricted operation. The restricted operation is determined in accordance with: the carrier frequency fc of the IGBT devices Q3 to Q8 serving as switching devices included in the inverter 14; and the inverter temperature T that corresponds to the temperature of the switching devices.

If the inverter temperature T becomes high, the control unit 30 limits the torque of the motor M1 so that the temperature of the inverter 14 cannot rise any more. The limit value for the torque is determined based on the inverter temperature T and the carrier frequency fc.

Figure 2:
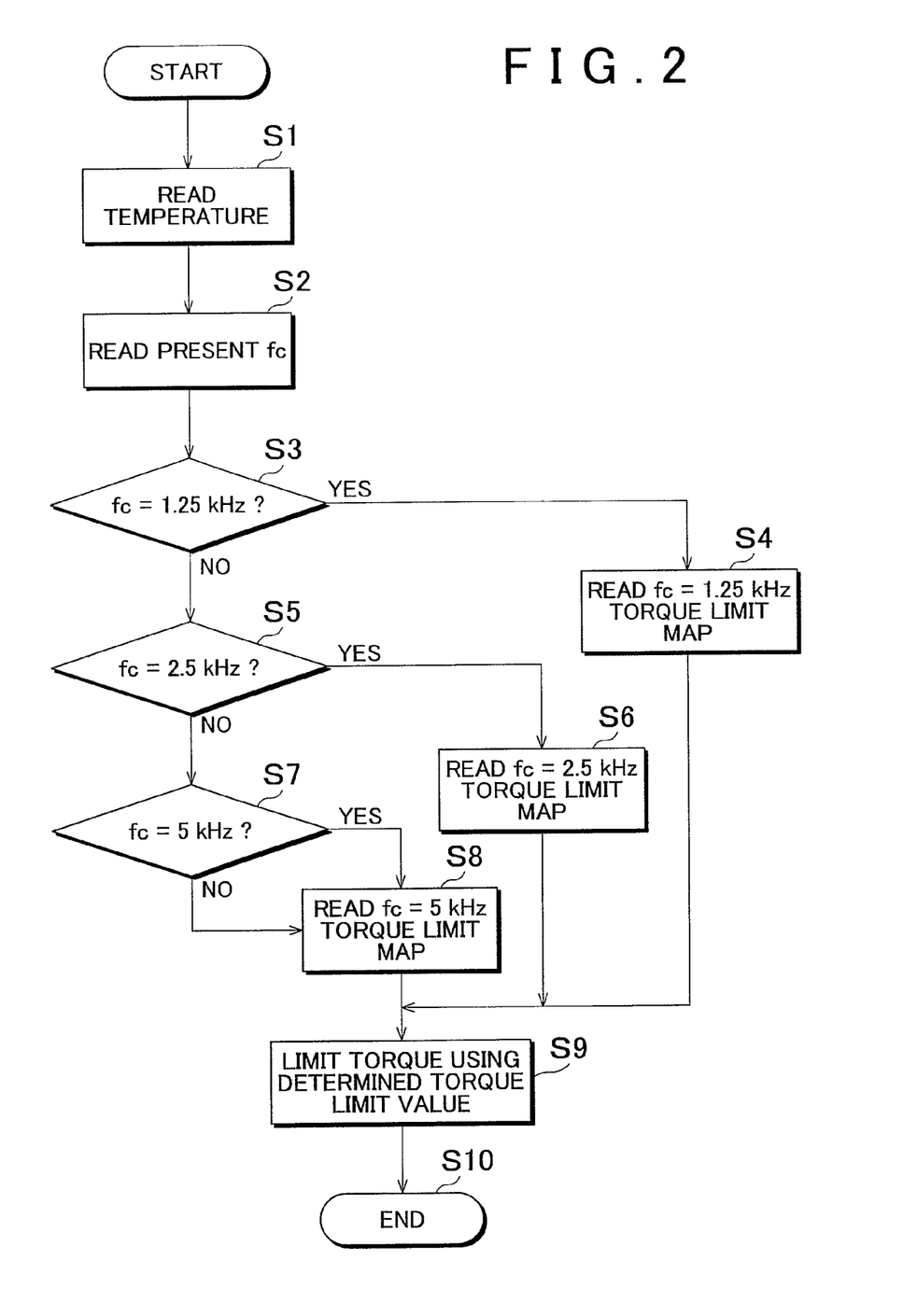
FIG. 2 is a flowchart that illustrates a control routine for a control unit 30 in FIG. 1.

FIG. 2 is a flowchart that illustrates the control routine of the control unit 30 of FIG. 1.

First, in step S1, the control unit 30 reads the inverter temperature T detected by the temperature sensor 35.

Then, the control unit 30 reads the present carrier frequency fc in step S2.

The carrier frequency fc will be described with reference to FIG. 3.

Figure 3:
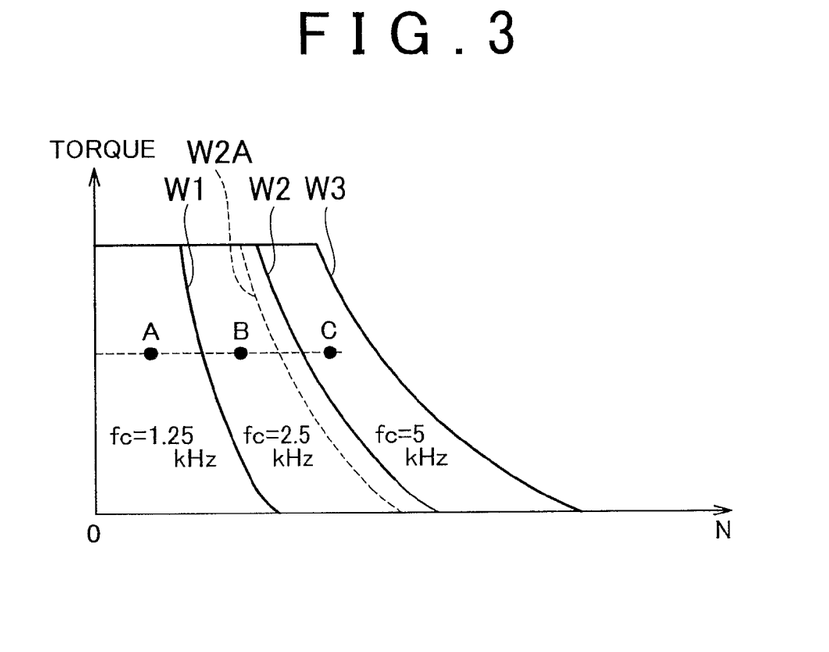
FIG. 3 is a diagram that illustrates a carrier frequency fc.

In FIG. 3, the horizontal axis indicates the rotation speed N of the motor M1, and the vertical axis indicates the required torque of the motor M1. In the area where the rotation speed N is equal to or within a borderline W1, that is, the area including the point A, the carrier frequency fc is set to 1.25 kHz.

In the area between borderlines W1 and W2, that is, the area including the point B, the carrier frequency fc is set to 2.5 kHz. In the area between borderlines W2 and W3, that is, the area including the point C, the carrier frequency is set to 5 kHz.

The control unit 30 determines the carrier frequency based on the map shown in FIG. 3. In step S2 of FIG. 2, the control unit 30 uses the carrier frequency fc which the control unit 30 itself determines.

In step S3, it is determined whether the carrier frequency fc is 1.25 kHz or not. If the carrier frequency fc is 1.25 kHz, the processing proceeds to step S4. If not, the processing proceeds to step S5.

In step S4, the control unit 30 reads a torque limit map for the carrier frequency fc of 1.25 kHz. Then, the processing proceeds to step S9.

In step S5, it is determined whether the carrier frequency fc is 2.5 kHz or not. If the carrier frequency fc is 2.5 kHz, the processing proceeds to step S6. If not, the processing proceeds to step S7.

In step S6, the control unit 30 reads a torque limit map for the carrier frequency fc of 2.5 kHz. After completion of step S6, the processing proceeds to step S9.

In step S7, it is determined whether the carrier frequency fc is 5 kHz or not. If the carrier frequency fc is 5 kHz, the processing proceeds to step S8 where the control unit 30 reads a torque limit map for the carrier frequency fc of 5 kHz.

Note that, even if the carrier frequency fc is not 5 kHz, the processing still proceeds to step S8. The processing is executed in this manner because the torque limit map for the carrier frequency of 5 kHz is the most stringent map. The routine may be changed such that the processing proceeds directly to step S8 without implementing the determination in step S7.

In step S8, the control unit 30 reads the torque limit map for the carrier frequency fc of 5 kHz. Then, the processing proceeds to step S9. In step S9, the control unit 30 controls the inverter 14 to rotate the motor with the torque limited by the determined torque limit value.

Then, the processing proceeds from step S9 to step S10 where the processing ends.

Figure 4:
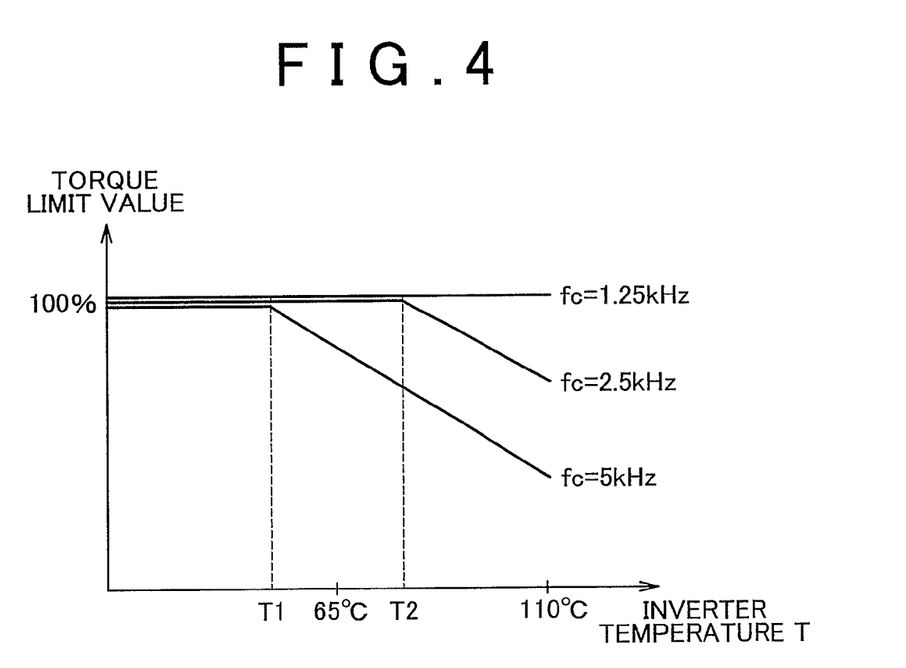
FIG. 4 is a diagram that illustrates torque limit maps used in steps S4, S6 and S8 in FIG. 2.

FIG. 4 illustrates the torque limit maps used in steps S4, S6 and S8 of FIG. 2.

In FIG. 4, the horizontal axis indicates the inverter temperature T detected by the temperature sensor 35 in FIG. 1. The vertical axis indicates the torque limit value which is the condition controlling drive of the motor M1.

As shown in FIG. 4, the torque limit value is determined in advance in accordance with the carrier frequency fc and the inverter temperature T equivalent to the temperature of the switching devices.

When the carrier frequency fc is 1.25 kHz, the torque is not limited during actual driving. A predetermined torque of 100% is selected as the torque limit value in every temperature range.

When the carrier frequency fc is 2.5 kHz, if the inverter temperature T is equal to or higher than T2, a greater limit on the torque is imposed as the temperature becomes higher. In other words, the torque limit value becomes smaller.

When the carrier frequency fc is 5 kHz, if the inverter temperature T is lower than T2 but not lower than T1, the torque limit value is set smaller as the temperature becomes higher.

As shown in FIG. 6, for example, when an initial temperature is 65° C. and the carrier frequency fc is 1.25 kHz or fc is 2.5 kHz, the temperature does not rise to 110° C., which is the temperature at which the switching device is damaged, even if the motor operation time is prolonged.

On the other hand, when the carrier frequency fc is 5 kHz, the switching loss becomes greater to the extent that the switching frequency is higher, and the switching loss generates heat. Therefore, if the initial temperature is 65° C. as in the cases where the carrier frequency fc is 1.25 kHz or fc is 2.5 kHz, the temperature may exceed 110° C. after a time t1. To avoid this, when the inverter temperature T is 65° C., the torque limit value is set to be small only when the carrier frequency fc is 5 kHz. However, when the inverter temperature T is 65° C. and operation is performed at a low carrier frequency, the required torque is not limited to the torque limit value.

With the above configuration, the required torque can be generated to the maximum extent possible and at the same time the switching device can be protected.

It should be noted that the rise in the inverter temperature T can be further suppressed by changing an application method of the torque limit value as described in the following.

In an operation area where the carrier frequency fc does not increase despite the rotation speed of the motor increasing by at least a predetermined amount, the motor performs a restricted operation based on the torque limit value. The torque limit value is determined in advance in accordance with a present carrier frequency fc and the inverter temperature T corresponding to the temperature of the switching devices. The above operation area is an area defined by, for example, the borderlines W1 and W2A in FIG. 3. In this area, the torque limit value in FIG. 4 is selected based on the present carrier frequency fc of 2.5 kHz and the motor performs a restricted operation.

In an operation area where the carrier frequency fc increases as the rotation speed of the motor increases by at least the predetermined amount, the motor may perform a restricted operation based on the torque limit value that is determined in advance in accordance with the increased carrier frequency fc and the inverter temperature T corresponding to the temperature of the switching devices. This area is an area defined by, for example, the borderlines W2A and W2 in FIG. 3. In this area, instead of the present carrier frequency fc of 2.5 kHz, the torque limit value in FIG. 4 is selected based on the increased carrier frequency fc of 5 kHz and the motor performs a restricted operation.

That is, in the operation area where the carrier frequency is liable to increase after a predetermined time, the limit value corresponding to with a predicted carrier frequency that is higher than the present carrier frequency is used. Moreover, the carrier frequency may be predicted based on monitoring of increase/decrease in the rotation speed of the motor. If it is predicted that the carrier frequency will increase, the restricted operation is performed ahead of this change by using the limit value corresponding to the predicted carrier frequency that is higher than the present carrier frequency. Furthermore, a hysteresis may be provided for use of the limit value. If it is predicted that the carrier frequency will decrease, the limit value corresponding to the present carrier frequency is applied without being changed.

In this embodiment, carrier frequency is set based on the rotation speed of the motor. Instead, carrier frequency may be set based on the vehicle speed.

While the invention has been described with reference to an example embodiment thereof, it should be understood that the invention is not limited to the example embodiment or constructions. To the contrary, the invention is intended to cover various modifications and equivalent arrangements. In addition, while the various elements of the example embodiment are shown in various combinations and configurations, which are exemplary, other combinations and configurations, including more, less or only a single element, are also within the spirit and scope of the invention.

The invention claimed is:

1. A motor control unit comprising:
a drive circuit that drives a motor that generates torque to obtain driving force of a vehicle, and
a control portion that controls the drive circuit, wherein the control portion controls the drive circuit using a limit value such that the motor performs a restricted operation, the limit value being determined in accordance with a switching frequency of a switching device included in the drive circuit and a temperature of the switching device.

2. The motor control unit according to claim 1, wherein the control portion controls the drive circuit by selecting the switching frequency in accordance with a rotation speed of the motor and a torque required from the motor.

3. The motor control unit according to claim 1, wherein the limit value is determined based on a torque limit value, and the torque limit value is determined in advance in accordance with the switching frequency and the temperature of the switching device.

4. The motor control unit according to claim 1, wherein the limit value is determined, when the switching frequency does not increase despite a rotation speed of the motor increasing by at least a predetermined amount, based on a torque limit value determined in advance in accordance with a present switching frequency and the temperature of the switching device, and the limit value is determined, when the switching frequency increases as the rotation speed of the motor increases by at least the predetermined amount, based on the torque limit value determined in advance in accordance with a predicted switching frequency that is higher than the present switching frequency and the temperature of the switching device.

5. A vehicle comprising:
a motor that generates torque to obtain driving force of the vehicle, and
a motor control unit that controls the motor, wherein
the motor control unit includes a drive circuit for driving the motor and a control portion for controlling the drive circuit, and
the control portion controls the drive circuit using a limit value such that the motor performs a restricted operation, the limit value being determined in accordance with a switching frequency of a switching device included in the drive circuit and a temperature of the switching device.

6. The vehicle according to claim 5, wherein the control portion controls the drive circuit by selecting the switching frequency in accordance with a rotation speed of the motor and a torque required from the motor.

7. The vehicle according to claim 5, wherein the limit value is determined based on a torque limit value, and the torque limit value is determined in advance in accordance with the switching frequency and the temperature of the switching device.

8. The vehicle according to claim 5, wherein the limit value is determined, when the switching frequency does not increase despite a rotation speed of the motor increasing by at least a predetermined amount, based on a torque limit value determined in advance in accordance with the switching frequency and the temperature of the switching device, and
the limit value is determined, when the switching frequency increases as the rotation speed of the motor increases by at least the predetermined amount, based on the torque limit value determined in advance in accordance with a predicted switching frequency that is higher than the present switching frequency and the temperature of the switching device.

* * * * *